United States Patent Office 2,998,345
Patented Aug. 29, 1961

2,998,345
METHOD OF PREPARING BORDEAUX MIXTURE CONCENTRATE
Charles H. Rogers, Norwalk, Conn., assignor to R. T. Vanderbilt Company, Inc., New York, N.Y., a corporation of New York
No Drawing. Filed July 26, 1957, Ser. No. 674,277
10 Claims. (Cl. 167—16)

This invention relates to Bordeaux mixtures, which are useful in combating the attack of fungus and other pests on vegetation.

Bordeaux mixture is one of the most widely used fungicides for the control of plant diseases, major crops on which it is extensively employed being cacao, grapes, bananas, and potaoes. Bordeaux mixture is a water suspension of a solid hydrogel complex prepared by adding a solution of copper sulfate to a slurry of hydrated lime. The copper sulfate solution is prepared by dissolving a weighed amount of pentahydrate, $CuSO_4.5H_2O$, equal to the weight of calcium hydroxide, $Ca(OH)_2$, used to make the slurry of hydrated lime. The solids content of Bordeaux mixture is normally in the range of 0.96% to 2.4% by weight expressed on the dry basis. The hydrogel form is most effective in plant disease control and gives the best suspension, spread and adhesion to foliage. One disadvantage of the Bordeaux mixture is its instability, for it does not long remain in the hydrogel form but deteriorates to the crystalloid form in a matter of hours. Bordeaux mixture, to be most effective, must be made up immediately before use.

In large scale spraying operations, for example on banana plantations where Bordeaux mixture is used to control Sigatoka disease caused by the fungus *Cercospora musae*, a network of mixing and pumping stations is required to serve the extensive acreage with the quantity of spray needed. In some cases interruptions in the spraying operation are unavoidable, for example in the case of inclement weather or mechanical failures, and the result is that because of the instability of the Bordeaux mixture the material cannot be held over until conditions are more favorable for spraying, and hence it must be discarded with a consequent substantial loss. It is apparent therefore that there are at least two major inherent disadvantages in the use of Bordeaux mixture in large scale operations. In the first place in many instances because of the large volumes involved the more expensive network of mixing and pumping stations is required and the spray cannot be handled in more economical mobile units. In the second place the fact that the spraying equipment and operation are on such a large scale involves inherent substantial losses of Bordeaux mixture in the event that the spraying operation is interrupted for any reason.

Several attempts have been made to develop a satisfactory dry concentrated Bordeaux mixture which can be diluted just prior to use, thereby avoiding the problems caused by large volume. Dry Bordeaux mixtures, however, are considerably inferior to the freshly prepared product because they do not result in a hydrogel, but only a rather poor suspension of crystals. It has not been possible to obtain the hydrogel form unless the Bordeaux mixture is made up immediately before use.

An object of the invention is to produce Bordeaux mixture in a form in which it can be readily handled on a large scale with relatively inexpensive equipment.

Another object of the invention is to produce Bordeaux mixture in a form in which it can be readily handled on a large scale with inexpensive equipment, and which resists the normal tendency of the Bordeaux mixture to be transformed from the hydrogel to the crystalloid form.

Other objects and advantages of the invention will be apparent from the following description.

In accordance with the present invention a liquid concentrate of Bordeaux mixture is made which will substantially equal the performance of ordinary freshly made Bordeaux mixture. To prepare this concentrate the hydrogel is formed in the usual manner by adding a solution of copper sulfate to a slurry of hydrated lime with agitation. Bordeaux mixture is then concentrated by removing the major portion of the water, leaving the hydrogel with some water as a concentrate, by mechanically separating the solid hydrogel from the liquid of the Bordeaux mixture by applying forces to increase relative movement between the solid and the liquid above that produced by gravity sedimentation, without any substantial increase in temperature of the Bordeaux mixture. The desired force may be applied to effect the relative movement between the solid and liquid in the Bordeaux mixture, for example, by using filtration techniques with differential pressure, in which the liquid is forced through a permeable membrane having openings which are small enough to restrain the passage of the solid, or by centrifugation in which the denser solids are forced outwardly from the center of a rapidly rotating centrifuge bowl while the less dense liquid tends to accumulate and is withdrawn from a point relatively closer to the center of the bowl. Where the centrifugation or filtration technique is employed, the operation, including the differential pressure in the case of filtration, and the revolutions per minute of the centrifuge bowl (and the resulting centrifugal force) is controlled so that the desired separation of the solid and liquid constituents of the Bordeaux mixture is effected and the solids are concentrated more rapidly than they would be merely by sedimentation under the influence of gravity. The concentration is thereby effected in a relatively short time so that there is no substantial amount of reversion of the hydrogel to the crystalloid form. The expression differential pressure, used in reference to the filtration, is intended to cover the application of positive pressure upon the material to be filtered and/or the use of vacuum or partial vacuum on the other side of the filter.

The concentration technique which is used according to the present invention is in contrast with other methods of concentration which are unsatisfactory. Thus evaporation by heating under vacum, spray drying, and decantation following gravity settling of the hydrogel have been found to be ineffective in producing a desirable Bordeaux mixture. Attempts to form a good hydrogel by reducing the volume of water in the initial reaction mixture below a volume which corresponds with 4.8% solids, e.g., a 20–20–100 Bordeaux mixture (the first figure representing pounds of copper sulfate, the second the pounds of hydrated lime and the third the gallons of water) were also unsuccessful. Dry mixing of the copper sulfate and hydrated lime in the accepted ratios, followed by dilution with water, was similarly unsatisfactory.

In preparing the Bordeaux mixture it is customary to prepare a solution of copper sulfate and a slurry of hydrated lime, and mix the two in proportions which will produce Bordeaux mixture having the desired total solids content and the desired ratio of copper salt to lime. The most widely used Bordeaux mixtures are believed to be those in which the ratio is one part by weight of copper sulfate pentahydrate to one part by weight of hydrated lime, and 4 parts of copper sulfate pentahydrate to 3 parts of hydrated lime, although other ratios such as two to one and ten to seven are also used.

One type of Bordeaux mixture is designated 10–10–100, the total solids content of which is 2.4% expressed as equal weights of $CuSO_4.5H_2O$ and $Ca(OH)_2$ on a dry basis. Other commonly used mixtures are 4–4–100, 8–8–100, 8–6–100, and 10–7.5–100. Although a variety of ratios of copper sulfate to lime and a number of total solids contents of the Bordeaux mixture may be used, depending upon the particular application, in order to prepare a Bordeaux mixture which is in the desirable hydrogel form and therefore has the optimum properties as a fungicide, it is important that the concentrations of copper sulfate in the copper sulfate solution and of lime in the lime slurry should be dilute enough so that the solids content of the resulting Bordeaux mixture is not greater than about 5% by weight expressed as equivalent copper sulfate and lime. The volume ratio frequently used for preparing a hydrogel having desired properties is four parts of copper sulfate solution to one part of hydrated lime slurry.

The amount of water removed from the Bordeaux mixture, for example by the filtration or centrifugation techniques, is such that the resulting concentrate contains at least about 6%, preferably at least about 10% and suitably as high as about 33% of solids expressed as equivalent copper sulfate and lime. Thus, if the starting material is a 10–10–100 Bordeaux mixture containing 2.4% solids two thirds of the water may be removed to produce a concentrate having 7.2% solids, or thirteen fourteenths of the water may be removed to produce a concentrate having fourteen times the solid concentration of the original Bordeaux, i.e., about 33% solids.

Although the concentrate produced by the centrifugation or filtration procedure is stable at room temperature for periods long enough to permit its shipment by air from factory to plantation, where it is capable of being used as is or in the reconstituted state, it is preferably stabilized to prevent the normal deterioration from the hydrogel to the crystallized form. This stabilization is accomplished by incorporating a water soluble salt of a ligno-sulfonic acid in the Bordeaux mixture by adding it to the dilute Bordeaux mixture before concentrating, but preferably by adding it to the concentrate, thus avoiding waste of stabilizer in the effluent water of centrifugation or the filtrate if filtration is employed. Preferably between about 1.5% and about 2.5% of the lignosulfonate based on the solids of the Bordeaux mixture is added to and thoroughly mixed with the concentrate, which then becomes stabilized in the hydrogel form. Calcium lignosulfonate and sodium lignosulfonate have been used and found to be effective stabilizers.

The concentrate may be reconstituted with water to the desired solids content of the Bordeaux mixture, or it may be applied directly to the plants in the concentrated form where such a procedure is desirable and practicable. Thus a 10–10–100 Bordeaux mixture concentrated to seven times its normal solids content (16.8% solids from the original 2.4% expressed in each case as the equivalent copper sulfate pentahydrate and lime) may be used as such. Although it has a substantially higher viscosity than the normal Bordeaux mixture, it still may be sprayed with apparatus having adequate pressure and suitably designed spray nozzles. A 4x or 5x concentrate can probably be handled and sprayed with the same equipment used to spray a dilute Bordeaux mixture. From a Bordeaux mixture concentrate having equal weights of copper sulfate pentahydrate and lime, 4–4–100, 8–8–100, 10–10–100 Bordeaux mixture may be produced, while from a concentrate in which the ratio of copper sulfate pentahydrate to lime is four to three, there may be produced Bordeaux mixtures of the 8–6–100 or the 10–7.5–100 type.

As previously indicated, one advantage of the invention is that it makes possible great economies in Bordeaux mixture spray control programs. An example of such an economy is found in helicopter spraying. At present in the use of helicopters for spraying Bordeaux mixture, 200 gallons may be carried per flight. For banana plantation spraying, at the rate of application used, i.e., 160 gallons per acre, only 1¼ acres may be covered in each flight. By using a concentrate however in accordance with the present invention, about 9 acres of banana plants may be sprayed by helicopter in a single flight. In cases where the concentrate is prepared at the plantation, it is suitable for use by helicopter without the addition of any stabilizer.

By utilizing the present invention moreover, it is possible to replace the multiplicity of mixing-punching stations and the elaborate network of a piping necessary for the distribution of the Bordeaux mixture, with one central plant producing a Bordeaux mixture concentrate, which can be delivered to spray locations by truck or railway tank car. Application can then be made by overhead sprays, powered by portable spray rigs carried along the roadways, or by spray towers. Furthermore, when acreage must be abandoned temporarily for the treatment of diseases such as the Panama disease, the portable rigs can be moved to productive areas and the expense of otherwise idle equipment can be avoided.

*Example 1*

A three liter batch of 10–10–100 Bordeaux mixture was prepared by slurrying 36 grams of hydrated lime in 600 ml. of water, slowly adding 2400 ml. of copper sulfate solution containing 36 grams of $CuSO_4.5H_2O$ with agitation. Twenty minutes was required to add all of the sulfate solution to the slurry, thereby to bring about the reaction between the copper sulfate and the lime to produce a typical blue hydrogel. The Bordeaux mixture was fed through a super-centrifuge, equipped with a clarifier bowl, operating at 18,000 r.p.m. The rate of feed was 1250 ml. per minute so the separation required about two and one-half minutes for the three liter batch. A concentrated hydrogel of 428 ml. volume was thus separated from a relatively clear water effluent of 2572 ml. volume. The hydrogel was thereby concentrated at seven times its concentration in the dilute Bordeaux mixture. To the concentrate so produced there was added 1.19 grams of stabilizer (1.65% based on the weight of the copper sulfate pentahydrate and lime) while stirring the concentrate sufficiently to produce good dispersion. The stabilizer was a blend of 94 parts by weight of calcium lignosulfonate and 6 parts by weight of a partial palmitic diester of alpha methyl D-glucoside (42% esterified, 42% unreacted palmitic acid and 16% unreacted alpha methyl D-glucoside). The stabilized concentrate was stored at room temperature (75–80° F.) for one month with no visible change in appearance. At the end of the month a 71.4 ml. sample of concentrate was diluted with 426.8 ml. of water, with agitation until homogeneous. The reconstituted Bordeaux mixture (10–10–100) was found to be substantially equal to freshly prepared 10–10–100 Bordeaux mixture, as measured by its excellent suspension characteristics, slow settling rate, spray coverage of foliage and retention on the foliage following rainfall. The Bordeaux mixture concentrate was aged for an additional month and samples thereof then were diluted to prepare a 10–10–100 Bordeaux mixture. The samples prepared from the stored concentrate continued to show the desirable characteristics, whereas a Bordeaux mixture control otherwise the same but not stabilized lost the desirable properties in a matter of 48 hours, deteriorating to the crystalloid form.

*Example 2*

A three liter batch of 10–10–100 Bordeaux mixture was prepared and concentrated by the procedure described in Example 1. To the 428 ml. of concentrate there was added 1.19 grams of calcium lignosulfonate while agitating the mixture until a good dispersion was achieved. The stabilized concentrate was stored for twelve days at room temperature with no visible change in appearance. At the end of this time a 71.4 ml. sample was diluted with 428.6 ml. of water with agitation until the mixture was homogeneous. Upon testing, the reconstituted concentrate (having a composition of 10-10-100) was found to have the properties of freshly prepared 10-10-100 Bordeaux mixture as previously measured in Example 1. The concentrate was stored for an additional two week period, at the end of which time a sample was diluted to the 10-10-100 composition and found to have satisfactory properties.

*Example 3*

A 10-10-100 Bordeaux mixture was prepared by the procedure described in Example 1 and was concentrated by filtration, removing 2572 ml. of clear filtrate water from the three liter batch. Filtration was accomplished in a filter flask, using a Buchner funnel with analytical filter paper (No. 576) under 30 pounds vacuum. Approximately ¾ of an hour was required. To the 428 ml. of concentrate there was added 1.19 grams of the stabilizer blend described in Example 1. The stabilized concentrate was stored for one month at room temperature (75-80° F.) with no visible change. A 71.4 ml. sample was then diluted and tested as in Example 1 and found to be substantially equal to freshly prepared 10-10-100 Bordeaux mixture. The concentrate continued to be satisfactory for an additional month, whereas freshly made 10-10-100 Bordeaux mixture deteriorated from the hydrogel to the crystalloid form within the 48 hours.

*Example 4*

A three liter batch of 10-10-100 Bordeaux mixture was prepared and concentrated by the procedure described in Example 3. The 428 ml. of concentrate was then stabilized by the addition of 1.19 grams of calcium lignosulfonate and was then stored at a room temperature (75-80° F.) for twelve days without any visible change in the concentrate. At the end of this time, a 71.4 ml. sample of the stabilized concentrate was diluted to a 10-10-100 Bordeaux mixture and tested as in Example 1. It proved to be substantially equal to the freshly made 10-10-100 Bordeaux mixture in this test and also after an additional twelve days' storage time, whereas the fresh Bordeaux mixture deteriorated within 48 hours.

*Example 5*

A three liter batch of 10-10-100 Bordeaux mixture was prepared and concentrated by the procedure described in Example 1. The concentrate was stored for one day at room temperature with no visible change in appearance. At the end of this time a 71.4 ml. sample was diluted with 428.6 ml. of water with agitation until the mixture was homogeneous. Upon testing, the reconstituted concentrate (having a composition of 10-10-100) was found to have the properties of freshly prepared 10-10-100 Bordeaux mixture as previously measured in Example 1.

*Example 6*

A three liter batch of 10-10-100 Bordeaux mixture was prepared and concentrated by the procedure described in Example 3. Its properties were the equivalent of the concentrate of Example 5.

Although specific and preferred features of the invention have been described, it will be apparent to those skilled in the art that there are many modifications and equivalents within the inventive concept. Hence, it is intended that all such modifications and equivalents be included within the scope of the appended claims.

I claim:

1. The method for preparing a concentrated Bordeaux mixture which comprises separating the solid hydrogel from the liquid of an original Bordeaux mixture by applying mechanical force to increase relative movement between solid and liquid above that produced by gravity sedimentation until the concentration of the solids in the mixture is at least 6% expressed as $CuSO_4 \cdot 5H_2O$ and $Ca(OH)_2$ equivalent.

2. The method of claim 1 wherein the solids content of the original Bordeaux mixture is not greater than 5% by weight expressed as equivalent $CuSO_4 \cdot 5H_2O$ and $Ca(OH)_2$.

3. The method of claim 1 wherein the speed of separation is such that the hydrogel form is substantially maintained during the separation.

4. The method of claim 1 wherein the separation is carried out by filtration using differential pressure.

5. The method of claim 1 wherein the separation is carried out by centrifugation.

6. The method of claim 1 wherein a stabilizing agent is incorporated within the Bordeaux mixture.

7. The method of claim 6 wherein the stabilizing agent is incorporated within the concentrate.

8. A liquid Bordeaux mixture concentrate having between about 6 and about 33% solids expressed as $CuSO_4 \cdot 5H_2O$ and $Ca(OH)_2$ equivalent in which the solid is substantially in the hydrogel form as in freshly made Bordeaux mixture and which can be diluted with water to produce a Bordeaux mixture having substantially the properties of freshly made Bordeaux mixture.

9. A concentrate as described in claim 8 containing a stabilizing agent.

10. A concentrate as described in claim 9 in which the stabilizing agent is a lignosulfonate.

References Cited in the file of this patent

UNITED STATES PATENTS

| | | |
|---|---|---|
| 1,786,125 | O'Kane | Dec. 23, 1930 |
| 1,954,171 | Goldsworthy | Apr. 10, 1934 |
| 2,040,811 | Nikitin | May 12, 1936 |
| 2,104,754 | Marsh | Jan. 11, 1938 |
| 2,172,314 | Adams | Sept. 5, 1939 |
| 2,442,234 | Dunmire | May 25, 1948 |
| 2,491,832 | Salvesen et al. | Dec. 20, 1949 |
| 2,573,252 | Farber | Oct. 30, 1951 |
| 2,573,253 | Farber | Oct. 30, 1951 |
| 2,719,631 | Vicard | Oct. 4, 1955 |

OTHER REFERENCES

Schneiderhan: "Prep. and Properties of Bordeaux Mixtures," College of Agriculture, West Va., University Bull. 283, 1937.

U.S. Dept. Agriculture, Bulletin No. 1178, Nov. 21, 1923, Bordeaux-oil Emulsion, pages 1-22.

Ohio Agricultural Experiment Station, Bulletin No. 130, January 1902, pages 29-30.

U.S. Dept. Agriculture, Bulletin No. 6, Bordeaux Mixture as a Fungicide, 1894, pages 8-11.

UNITED STATES PATENT OFFICE
CERTIFICATE OF CORRECTION

Patent No. 2,998,345            August 29, 1961

Charles H. Rogers

It is hereby certified that error appears in the above numbered patent requiring correction and that the said Letters Patent should read as corrected below.

Column 4, line 9, for "mixing-punching" read -- mixing-pumping --.

Signed and sealed this 9th day of January 1962.

(SEAL)
Attest:

ERNEST W. SWIDER
Attesting Officer

DAVID L. LADD
Commissioner of Patents